(No Model.) 3 Sheets—Sheet 1.
F. D. FRY.
MACHINE FOR BLOCKING HATS.

No. 487,442. Patented Dec. 6, 1892.

WITNESSES:
J. Kinch.
S. S. Williamson.

INVENTOR
F. D. Fry
BY
ATTORNEY (No Model.) 3 Sheets—Sheet 2.
F. D. FRY.
MACHINE FOR BLOCKING HATS.
No. 487,442. Patented Dec. 6, 1892.
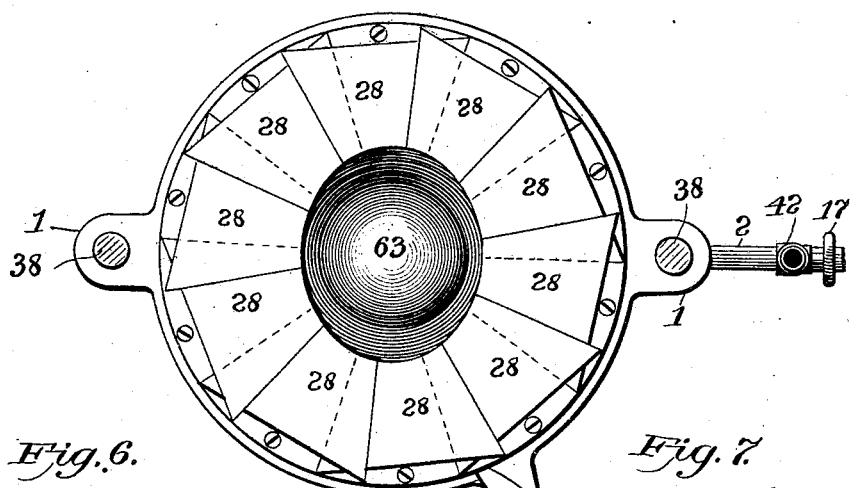
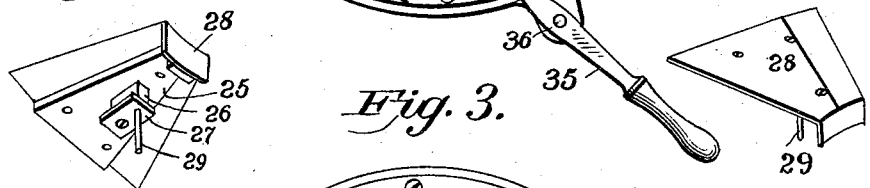
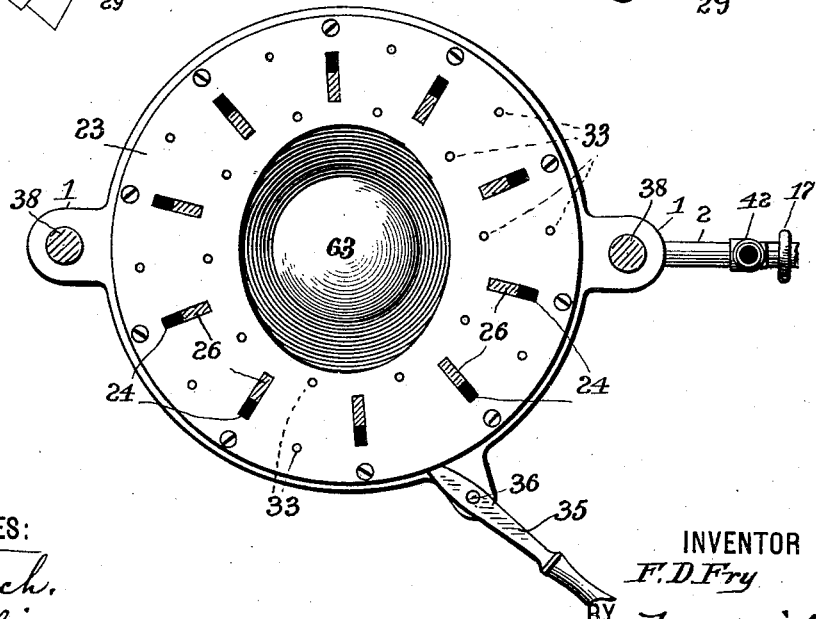
WITNESSES:
J. F. Finch.
S. Williamson.
INVENTOR
F. D. Fry
BY F. W. Smith Jr.
ATTORNEY (No Model.) 3 Sheets—Sheet 3.

F. D. FRY.
MACHINE FOR BLOCKING HATS.

No. 487,442. Patented Dec. 6, 1892.

WITNESSES:
J. S. Finch
S. S. Williamson.

INVENTOR
F. D. Fry
BY F. W. Smith Jr.
ATTORNEY

UNITED STATES PATENT OFFICE.

FREDERICK D. FRY, OF DANBURY, CONNECTICUT.

MACHINE FOR BLOCKING HATS.

SPECIFICATION forming part of Letters Patent No. 487,442, dated December 6, 1892.

Application filed February 8, 1892. Serial No. 420,772. (No model.)

*To all whom it may concern:*

Be it known that I, FREDERICK D. FRY, a citizen of the United States, residing at Danbury, in the county of Fairfield and State of Connecticut, have invented certain new and useful Improvements in Machines for Pressing the Brims, Blocking the Crowns, and Forming the Bands of Hats; and I do hereby declare the following to be a full, clear, and exact description of the invention, such as will enable others skilled in the art to which it appertains to make and use the same.

My invention relates to machines for banding, pressing the brims, and shaping the crowns of hats, and has for its object to effectually perform these operations and to greatly facilitate the production of superior results by the admission of cool air to the hat after the latter has been steamed.

Figure 1:
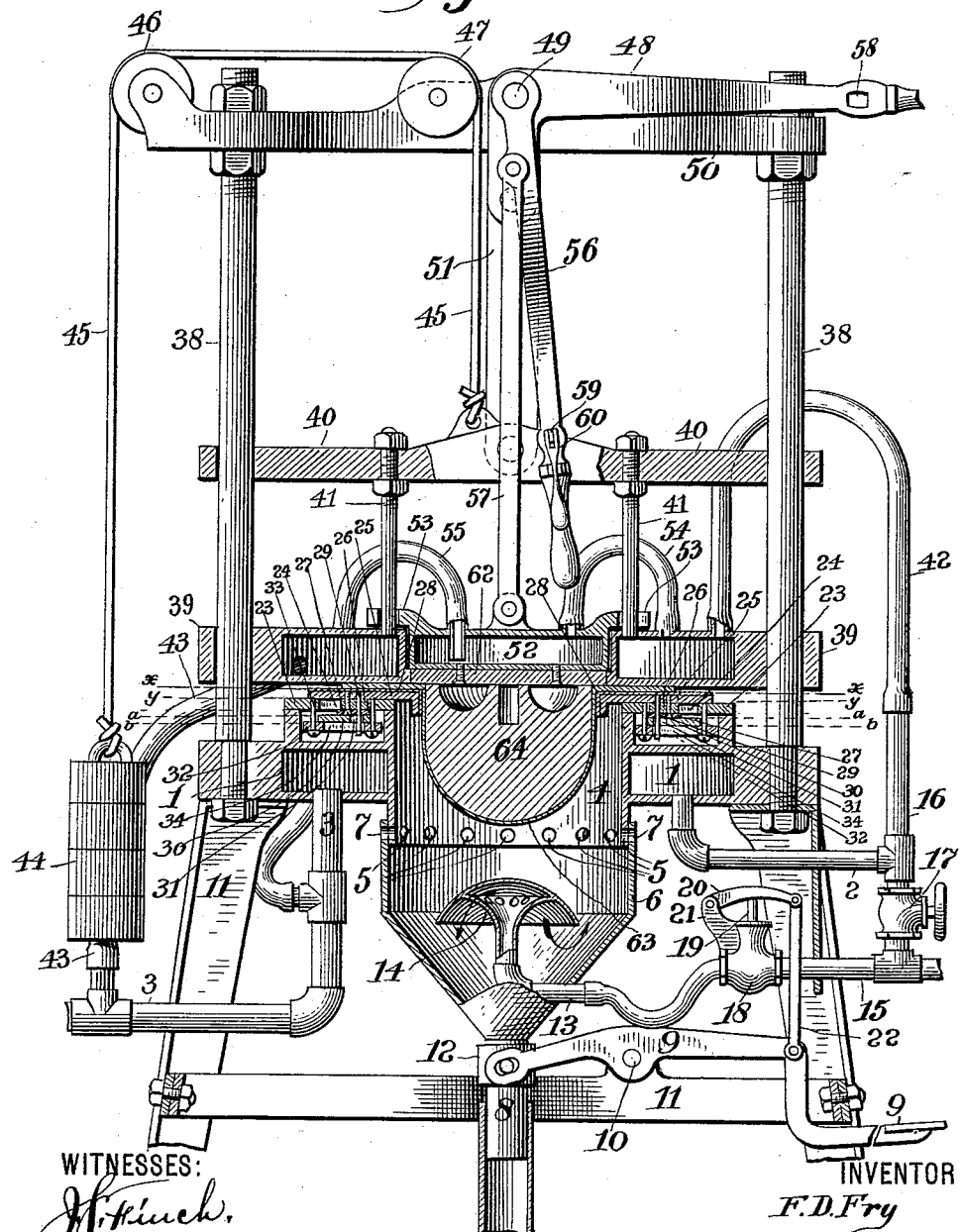

In the accompanying drawings, Figure 1 is a sectional elevation of my improved machine with the parts in operative positions. Figs. 2, 3, 4, and 5 are detail sections at the lines $x\,x$, $y\,y$, $a\,a$, and $b\,b$, respectively, on Fig. 1. Figs. 6 and 7 are respectively detail bottom and top perspectives of one of the clamping-fingers.

Similar numbers of reference denote like parts in the several figures of the drawings.

1 is an annular steam-bed, 2 its steam-inlet pipe, and 3 its steam-outlet pipe.

4 is a steam-drum central of the bed 2 and having perforations 5 at the bottom.

6 is a steam-pot inclosing the bottom of the drum 4 and having perforations 7, which register with the perforations 5 when said pot is in its normal or depressed position.

8 is an exhaust-pipe depending from the bottom of the pot.

9 is a treadle pivoted at 10 to the frame 11 of the machine and loosely connected to a collar 12 around the pipe 8, whereby when said treadle is operated the pot will be elevated and the perforations 5 7 thrown out of alignment.

13 is a steam-inlet pipe leading within the pot and surmounted by an ordinary baffle-plate 14.

15 is a steam-pipe supported in the frame of the machine and communicating with the pipe 16, into which latter the pipe 2 leads.

17 is an ordinary valve, which controls admission of steam to pipes 2 and 16. At the inner end of the pipe 15 is an ordinary valve 18, whose stem 19 is normally elevated by a spring (not shown) to close the valve.

20 is an arm pivoted to an ear 21, extending from the frame 11 and resting on the stem 19, and 22 is a link, whose ends are pivoted, respectively, to the arm 20 and the treadle, whereby the operation of the latter will cause the stem to be depressed, and thereby open the valve 18 to admit steam within the pot.

The above-described mechanism and construction pertain to the proper steaming and cooling of the hat, and I will now describe the means which I employ to band the hat and to press the brim thereof.

23 is an annular ring secured on the bed 1 and having therein radial ways 24.

25 are clamping-fingers of any suitable shape and having rigid therewith blocks 26, which fit within the ways 24, keepers 27 being secured to the lower ends of said blocks beneath the ring 23, whereby vertical displacement of the fingers is prevented. These fingers rest on the upper surface of the ring 23, and to them are secured face-plates 28, whose lateral adjacent edges are conversely beveled, so as to overlap each other, as shown in Figs. 2, 6, and 7.

29 are pins, which project downward from the blocks 26.

Figure 4:
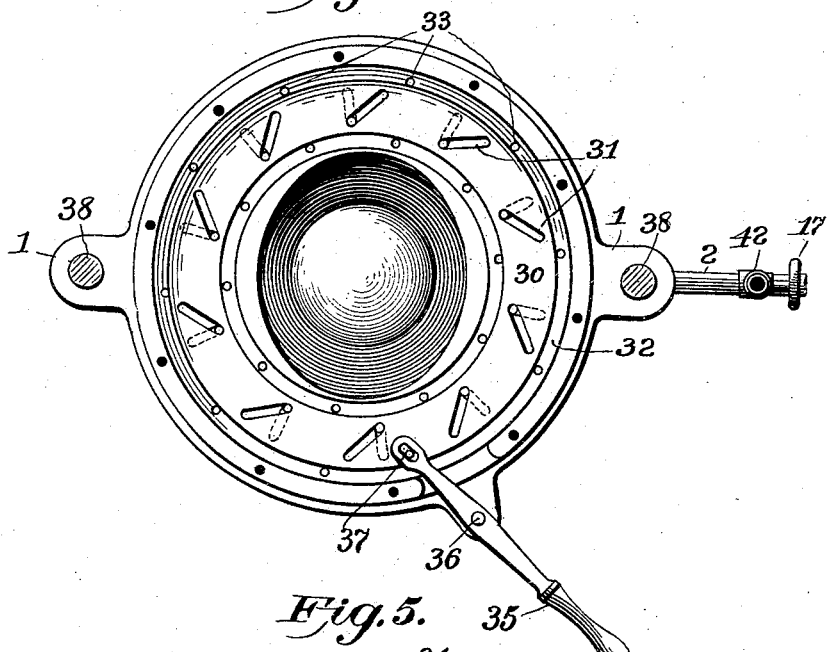
Figure 5:
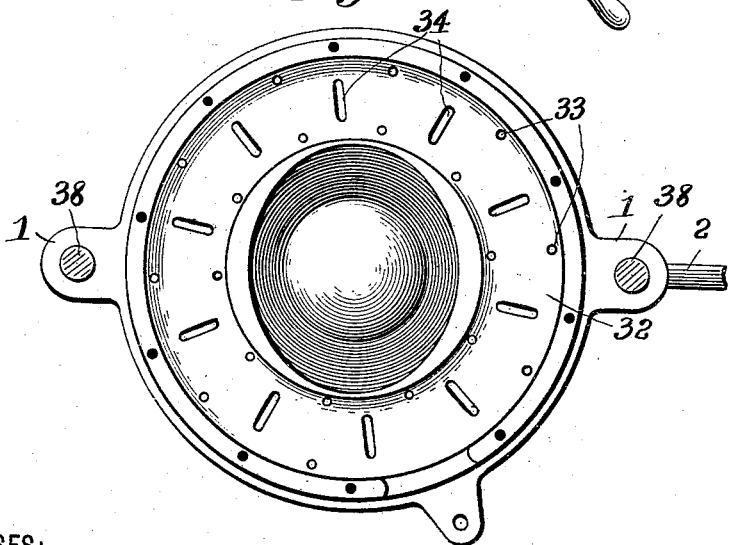

30 is an annular cam-plate having cam-slots 31, through which the pins 29 project, said plate resting upon a bottom plate 32, which latter is secured to the ring 23 by bolts 33, said bolts extending around the edge of the plate 30 in a circle, and thereby affording means for confining said plate, as shown at Fig. 4. Within this bottom plate 32 are auxiliary guideways 34, within which the pins 29 extend. A lever 35, pivoted at 36 to the bed 1 and loosely connected at 37 to the cam-plate 30, is the means whereby the clamping-fingers are operated. The operation of these clamping devices is the same as is set forth in Letters Patent No. 465,129, issued to me December 15, 1891, and I will not further describe such devices.

38 are uprights rising from the bed 1, and 39 is the brim-presser, guided on said uprights and having a yoke 40 rising therefrom and supported and secured by bolts 41.

42 is a flexible inlet-pipe leading from the pipe 16 within the presser 39, which latter is hollow and of annular shape, and 43 is a flexible outlet-pipe leading from the presser into the exhaust 3.

44 is a counterpoise, which is secured to a rope 45, the free end of the latter being run over pulleys 46 47 and secured to the yoke 40.

48 is a bell-crank pivoted at 49 to a cross-bar 50, supported on the uprights 38.

51 is a toggle-link, whose ends are pivoted to the yoke and to the tail of the bell-crank, respectively. By throwing the bell-crank upward the brim-presser will be elevated, while by pulling said bell-crank downward the brim-presser may be depressed with great force.

The block-presser comprises a hollow steam-box 52, having ears 53, which embrace the bolts 41, whereby said box is guided in its vertical movements.

54 is a flexible pipe leading from the presser 39 within this box 52, and 55 is a flexible pipe leading from said box to the exhaust 3.

56 is a lever pivoted at 49 in common with the crank 48, and 57 is a link, whose ends are respectively pivoted to said lever and to the box 52, so that it will be readily understood that the elevation and depression of said box may be effected by raising or lowering the lever 56.

58 is a perforation in the lever 48, and 59 is a bolt carried by a dog 60, pivoted to the lever 56, whereby when the lever 56 is elevated said bolt may be thrown into said perforation to lock the levers 48 and 56 together, thereby holding the box 52 in elevated position. Secured to the bottom of the box 52 is a substantial and properly-shaped presser-plate 62.

The clamping-fingers overhang within the drum 4 beyond the inner edge of the brim-presser, and the plate 62 when depressed co-operates with said fingers to form a sharp band to the hat.

The operation of my improvement is as follows: The brim and block pressers being in their normal or elevated position, a hat 63 on a block 64 is placed with its crown within the drum 4 and its brim resting upon the upper surfaces of the clamping-fingers. The lever 35 is now operated to clamp the hat to the block, and the lever 48 is operated to depress the presser 39 upon the brim, steam being admitted within the presser and bed either before or after this operation. The treadle is now depressed, thereby throwing live steam into the pot and drum against the hat-crown to soften the same. The bolt 59 is then withdrawn from the lever 48 and the lever 56 is operated to depress the block-presser against the block, thereby forcing the latter within the softened hat-crown. When the treadle is released, the pot will be dropped, thereby admitting cold air to the hat through the registering perforations 5 7, and simultaneously with the dropping of the pot the supply of steam to said drum is cut off by reason of the automatic action of the valve 18.

As hereinbefore set forth, the clamping-fingers overhang the steam-drum and the heated block-presser clamps the inner portion of the brim firmly against the clamping-fingers. This is a very important feature of my invention, as will be apparent from the following reasons: Heretofore the brim has been first clamped throughout its entire area by the brim-presser, and the block has then been forced within the hat-crown; but though this will give a sharp band to the hat the forcing of the block into the crown will stretch the hat at the banding-angle, thereby weakening the hat at a point where strength and stiffness are desired.

By primarily clamping only the outer area of the brim, as in my present invention, nearly all the stretching caused by the forcing of the block within the crown is sustained by the unclamped inner area of the brim, and by clamping the brim at or near the banding part only after such stretching a sharper and stiffer band is obtained.

I claim—

1. The combination of the brim and block pressers, the bell-crank 48 and lever 56, pivoted to a stationary part of the machine, the toggle-links 51 57, whose upper ends are respectively pivoted to said crank and lever and whose lower ends are respectively pivoted to the frame of the brim-presser and to the block-presser, and means, as a bolt or latch, for locking the crank and lever together, substantially as set forth.

2. The combination of the drum, the pot inclosing the same and capable of a vertical movement, said drum and pot having openings which register when the pot is in its normal or lowermost position, suitable connections whereby steam is admitted to the pot and drum, and means for raising said pot when steam is admitted, whereby said openings are thrown out of alignment, substantially as set forth.

3. The combination of the circumferentially-arranged and radially-operating banding-clamps, the hat-block, the block-presser which extends circumferentially beyond the block and overlaps the brim of the hat, and the brim-presser which operates upon the brim in a plane without the circumference of the block-presser, and means for operating said brim-presser in advance of the block-presser, substantially as set forth.

In testimony whereof I affix my signature in presence of two witnesses.

FREDERICK D. FRY.

Witnesses:
 GEO. WAKEMAN,
 NORMAN HODGE.